United States Patent
Matsumoto et al.

(10) Patent No.: US 10,933,393 B2
(45) Date of Patent: Mar. 2, 2021

(54) REDUCING GAS SUPPLYING APPARATUS AND METHOD FOR MANUFACTURING PROCESSED TARGET OBJECT

(71) Applicant: ORIGIN COMPANY, LIMITED, Saitama (JP)

(72) Inventors: Yutaka Matsumoto, Saitama (JP); Hiroshi Akama, Saitama (JP)

(73) Assignee: ORIGIN COMPANY, LIMITED, Saitama (JP)

( * ) Notice: Subject to any disclaimer, the term of this patent is extended or adjusted under 35 U.S.C. 154(b) by 0 days.

(21) Appl. No.: 16/622,245

(22) PCT Filed: Jul. 24, 2019

(86) PCT No.: PCT/JP2019/029017
§ 371 (c)(1),
(2) Date: Dec. 12, 2019

(87) PCT Pub. No.: WO2020/079909
PCT Pub. Date: Apr. 23, 2020

(65) Prior Publication Data
US 2020/0406209 A1 Dec. 31, 2020

(51) Int. Cl.
*B01J 4/00* (2006.01)
*B23K 3/08* (2006.01)
*B01J 4/02* (2006.01)

(52) U.S. Cl.
CPC .......... *B01J 4/008* (2013.01); *B01J 4/02* (2013.01); *B23K 3/08* (2013.01); *B01J 2219/00162* (2013.01); *B01J 2219/00182* (2013.01)

(58) Field of Classification Search
CPC ....... B01J 4/008; B01J 4/02; B01J 7/02; B01J 2219/00162; B01J 2219/00182; B23K 3/08; B23K 1/008
See application file for complete search history.

(56) References Cited

U.S. PATENT DOCUMENTS

2011/0091650 A1    4/2011   Noguchi et al.

FOREIGN PATENT DOCUMENTS

EP    0949212 A1    10/1999
JP    2002-210555 A    7/2002
(Continued)

OTHER PUBLICATIONS

Communication forwarding the extended European Search Report dated Apr. 14, 2020 issued for European Patent Application No. 19813405.8, 7 pages.
(Continued)

*Primary Examiner* — Lessanework Seifu
(74) *Attorney, Agent, or Firm* — Squire Patton Boggs (US) LLP (57) ABSTRACT

To provide a reducing gas supplying apparatus and a method for manufacturing a processed target object, which are capable of supplying a reducing liquid without causing it to scatter. The reducing gas supplying apparatus 1 includes a chamber 10 defining a space where soldering is performed on a target object T, a vaporizer 20 for generating a reducing gas FG to be supplied into the chamber 10 by receiving a reducing liquid FL to be converted into the reducing gas FG and vaporizing the reducing liquid FL, an intermediate container 30 for temporarily reserving the reducing liquid FL before the reducing liquid FL in a reducing liquid bottle 80 is introduced into the vaporizer 20, a transport tube 51, a supply tube 41, a transport part 58 for delivering the reducing liquid FL in the bottle 80 into the intermediate container 30, and a supply part 48 for delivering the reducing liquid FL in the intermediate container 30 into the vaporizer 20. The method includes supplying the object T into the chamber 10, performing soldering on the object T while supplying the reducing gas FG into the chamber 10,
(Continued)

and taking the object T on which the soldering has been performed out of the chamber 10.

8 Claims, 2 Drawing Sheets

(56) References Cited

FOREIGN PATENT DOCUMENTS

| | | | |
|---|---|---|---|
| JP | 5884448 | B2 | 6/2013 |
| JP | 6042956 | B1 | 4/2017 |
| JP | 2018-034162 | A | 3/2018 |
| JP | 6322746 | B1 | 11/2018 |

OTHER PUBLICATIONS

International Search Report dated Oct. 15, 2019 for International Application No. PCT/JP2019/029017, 4 pages with English translation.

FIG. 1 ures, drawings, and the claims.

REDUCING GAS SUPPLYING APPARATUS AND METHOD FOR MANUFACTURING PROCESSED TARGET OBJECT

CROSS-REFERENCE

This application is a 35 U.S.C. 371 filing of International Application No. PCT/JP2019/029017 filed on Jul. 24, 2019, which claims priority to Japanese Application No. JP 2018-194006 filed on Oct. 15, 2018, both of which are incorporated verbatim herein by reference in their entirety, including the specifications, drawings, and the claims.

TECHNICAL FIELD

The present invention relates to a reducing gas supplying apparatus and a method for manufacturing a processed target object, and, more particularly, to a reducing gas supplying apparatus and a method for manufacturing a processed target object, which are capable of supplying a reducing liquid without causing it to scatter.

BACKGROUND ART

When soldering is performed on a bonding target object, a reducing gas such as a formic acid gas is supplied into a chamber in which soldering is performed on the bonding target object in order to reduce oxides on metal surfaces (see Patent Document 1, for example).

RELATED ART DOCUMENT

Patent Document

[Patent Document 1] JP 6042956 B

SUMMARY OF THE INVENTION

Problem to be Solved by the Invention

A reducing gas supplied into a chamber is usually stored in a state of liquid (which may be hereinafter referred to as "reducing liquid") from the standpoint of ease of storage, and vaporized before being supplied into the chamber. As means for supplying a reducing liquid stored in a bottle, there is conventionally means for delivering a reducing liquid from a bottle, which is installed in a pressure tank and containing a reducing liquid, by supplying an inert gas such as nitrogen into the pressure tank to pressurize the inside of the pressure tank. However, in this means, the reducing liquid may squirt out of the bottle when the pressure is applied, which leads to inconveniences such as waste of the reducing liquid and the risk of touching the scattered reducing liquid during bottle replacement.

In view of the above problem, an object of the present invention is to provide a reducing gas supplying apparatus capable of supplying a reducing liquid without causing it to scatter, and a method for manufacturing a processed target object using this apparatus.

Means for Solving the Problem

Figure 1:
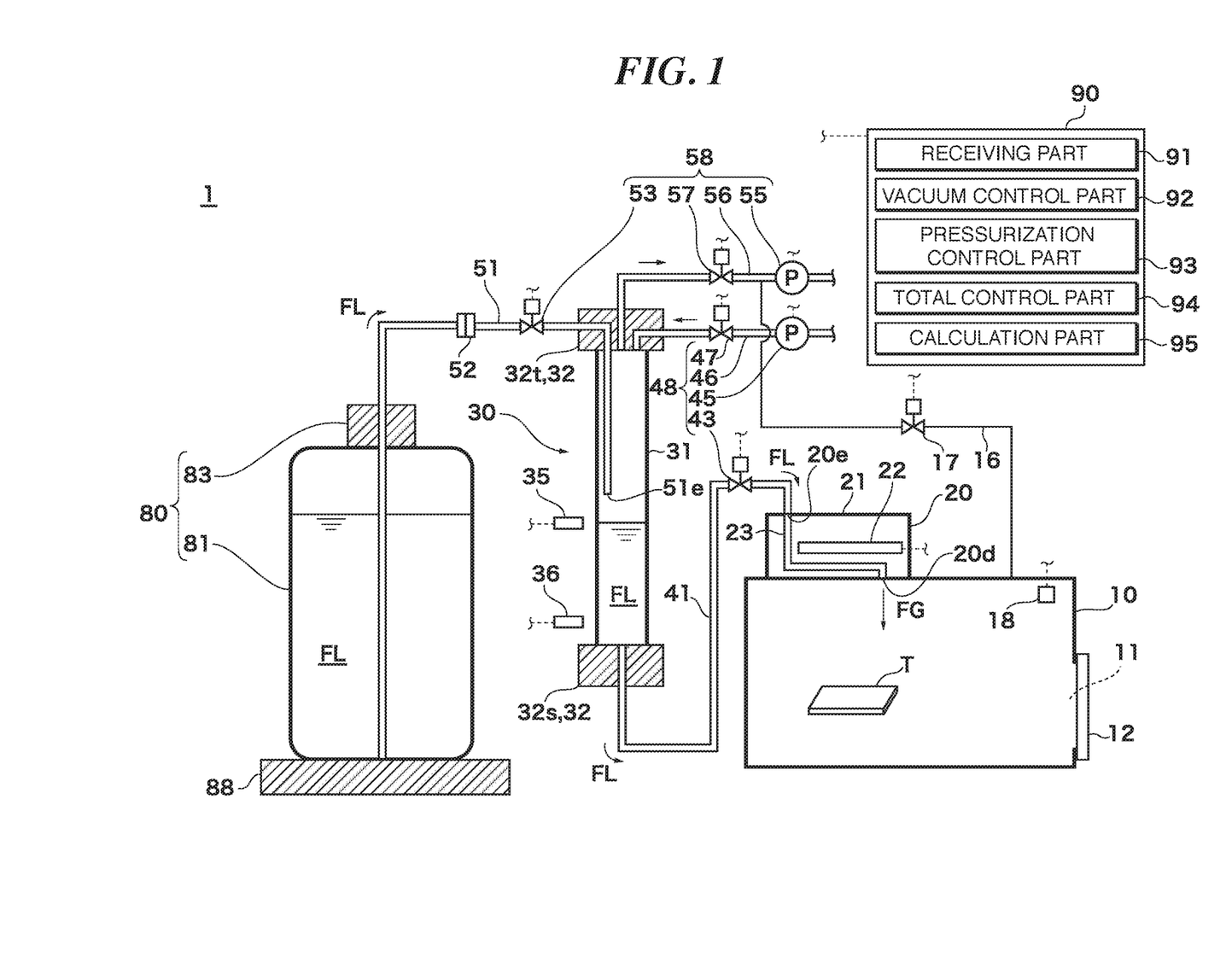
FIG. 1 is a schematic system diagram illustrating a general configuration of the formic acid supplying apparatus according to an embodiment of the present invention.

To achieve the above object, a reducing gas supplying apparatus according to the first aspect of the present invention includes, as shown in FIG. 1, for example, a chamber 10 defining a space in which soldering is performed on a target object T; a vaporizer 20 for generating a reducing gas FG to be supplied into the chamber 10, the vaporizer 20 being configured to receive a reducing liquid FL to be converted into the reducing gas FG and vaporize the reducing liquid FL to generate the reducing gas FG; an intermediate container 30 for temporarily reserving the reducing liquid FL before the reducing liquid FL in a reducing liquid bottle 80 containing the reducing liquid FL is introduced into the vaporizer 20; a transport tube 51 for directing the reducing liquid FL in the reducing liquid bottle 80 to the intermediate container 30; a supply tube 41 for directing the reducing liquid FL in the intermediate container 30 to the vaporizer 20; a transport part 58 for delivering the reducing liquid FL in the reducing liquid bottle 80 into the intermediate container 30; and a supply part 48 for delivering the reducing liquid FL in the intermediate container 30 into the vaporizer 20.

With this configuration, the reducing liquid can be supplied to the vaporizer without causing it to scatter, and the reducing gas can be stably supplied into the chamber.

As for the reducing gas supplying apparatus according to the second aspect of the present invention, as shown in FIG. 1, for example, in the reducing gas supplying apparatus 1 according to the first aspect, the transport part 58 includes a negative pressure generating part 55 for creating a negative pressure in the intermediate container 30.

With this configuration, the reducing liquid can be delivered into the intermediate container by a pressure difference between the inside of the intermediate container and the inside of the reducing liquid bottle by creating a negative pressure inside the intermediate container, and air bubbles contained, if any, in the reducing liquid delivered into the intermediate container can be removed.

As for the reducing gas supplying apparatus according to the third aspect of the present invention, as shown in FIG. 1, for example, in the reducing gas supplying apparatus 1 according to the first aspect or the second aspect, the supply part 48 includes a pressurizing part 45 for pressurizing an inside of the intermediate container 30.

With this configuration, the reducing liquid in the intermediate container can be fed under pressure toward the vaporizer by pressurizing an inside of the intermediate container.

As for the reducing gas supplying apparatus according to the fourth aspect of the present invention, as shown in FIG. 1, for example, the reducing gas supplying apparatus 1 according to any one of the first aspect to the third aspect further includes the reducing liquid bottle 80 having a bottle cap 83, wherein the bottle cap 83 is configured to take in outside air through a filter with a check valve when the reducing liquid bottle 80 has a negative pressure therein.

With this configuration, when the reducing liquid in the reducing liquid bottle is consumed, the supply of reducing liquid can be easily continued by replacing the entire reducing liquid bottle containing the reducing liquid.

As for the reducing gas supplying apparatus according to the fifth aspect of the present invention, as shown in FIG. 1, for example, the reducing gas supplying apparatus 1 according to any one of the first aspect to the fourth aspect further includes a high liquid level sensor 35 for detecting a liquid surface of the reducing liquid FL in the intermediate container 30 reaching a liquid level equal to a predetermined high liquid level; and a first control part 92 for controlling the transport part 58 to stop the delivery of the reducing liquid FL in the reducing liquid bottle 80 into the intermediate container 30 when the high liquid level sensor 35 detects the high liquid level.

With this configuration, it is possible to prevent the liquid level in the intermediate container from rising excessively and to prevent an end of the transport tube from being submerged in the liquid.

As for the reducing gas supplying apparatus according to the sixth aspect of the present invention, as shown in FIG. 1, for example, the reducing gas supplying apparatus 1 according to the fifth aspect further includes a low liquid level sensor 36 for detecting the liquid surface of the reducing liquid FL in the intermediate container 30 reaching a liquid level equal to a predetermined low liquid level; and a second control part 93 for controlling the supply part 48 to stop the delivery of the reducing liquid FL in the intermediate container 30 into the vaporizer 20 when the low liquid level sensor 36 detects the low liquid level.

With this configuration, because the volume between the high liquid level and the low liquid level can be grasped, the amount of reducing liquid supplied to the vaporizer and the amount of reducing gas supplied into the chamber can be grasped.

As for the reducing gas supplying apparatus according to the seventh aspect of the present invention, as shown in FIG. 1, for example, the reducing gas supplying apparatus 1 according to any one of the first aspect to the sixth aspect further includes a pressure sensor 18 for detecting a pressure in the chamber 10; and a third control part 93 for controlling the supply part 48 to adjust the amount of the reducing liquid FL to be delivered into the vaporizer 20 based on a pressure detected by the pressure sensor 18.

With this configuration, the amount of reducing gas in the chamber can be estimated from a pressure detected by the pressure sensor, and a decrease in reduction action during soldering can be prevented by appropriately adjusting the amount of reducing gas in the chamber.

Figure 2:
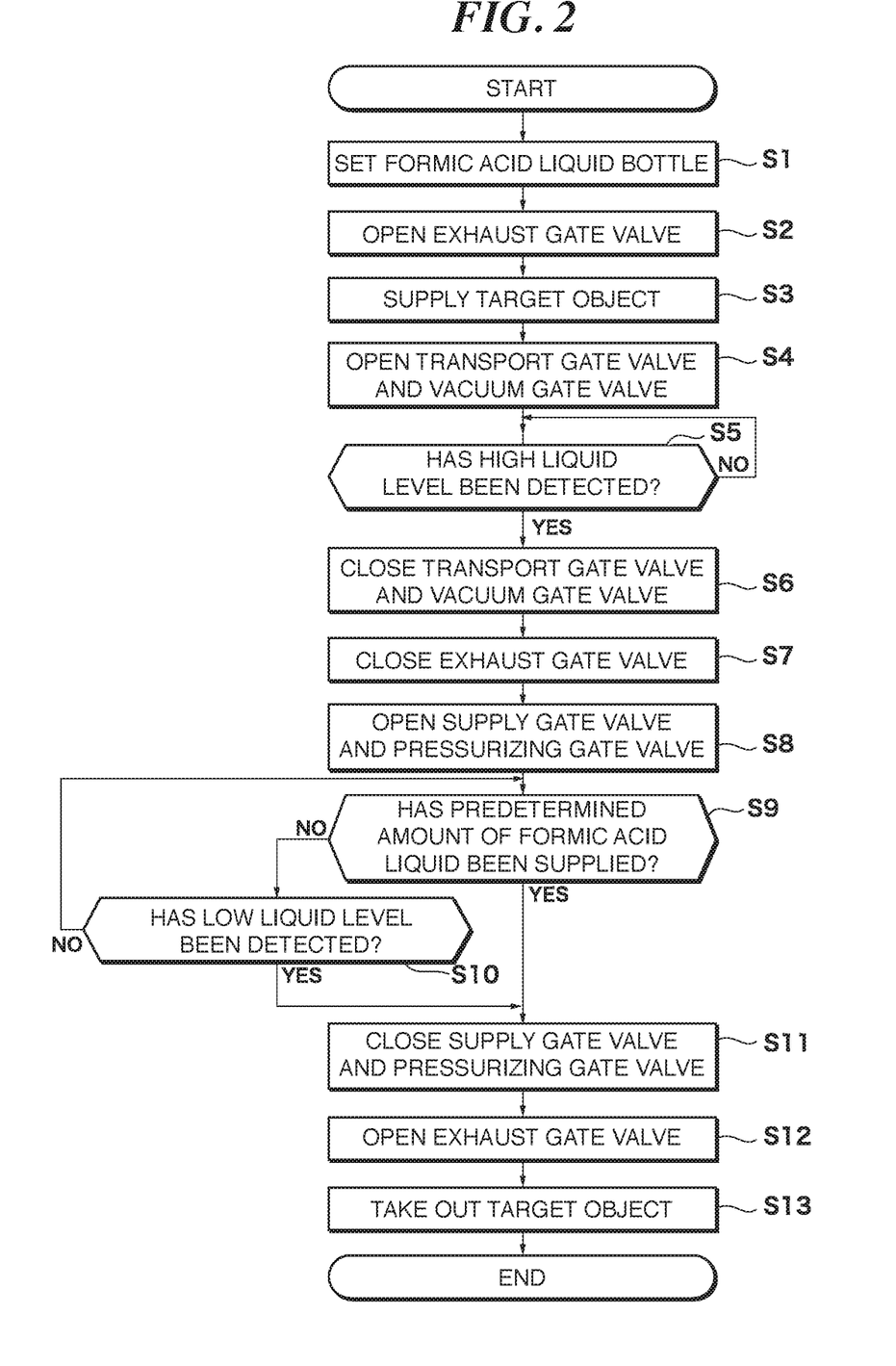
FIG. 2 is a flowchart showing a procedure for manufacturing a processed target object.

As for a method for manufacturing a processed target object according to the eighth aspect of the present invention, as shown in FIGS. 2 and 1, for example, the method is a method for manufacturing a processed target object obtained by performing soldering on the target object T using a reducing gas supplying apparatus 1 of any one of the first aspect to seventh aspect. The method includes the steps of: supplying the target object T into the chamber 10 (S3); performing soldering on the target object T while supplying the reducing gas FG into the chamber 10 (S8 to S10); and taking the target object T on which the soldering has been performed out of the chamber 10 (S13).

With this configuration, it is possible to manufacture a processed target object while stably supplying the reducing gas into the chamber by supplying the reducing liquid into the vaporizer without causing it to scatter.

Effects of the Invention

According to the present invention, the reducing liquid can be supplied to the vaporizer without causing it to scatter, and the reducing gas can be stably supplied into the chamber.

DESCRIPTION OF EMBODIMENTS

This application is based on the Patent Application No. 2018-194006 filed on Oct. 15, 2018 in Japan, the contents of which are hereby incorporated in its entirety by reference into the present application, as part thereof.

The present invention will become more fully understood from the detailed description given hereinbelow. Further range of application of the present invention will become clearer from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

Description will hereinafter be made of an embodiment of the present invention with reference to the drawings. The same or corresponding members are denoted with the same reference numerals in all the drawings, and their descriptions are not repeated.

Referring first to FIG. 1, a formic acid supplying apparatus 1 according to an embodiment of the present invention is described. FIG. 1 is a schematic system diagram illustrating a general configuration of the formic acid supplying apparatus 1. The formic acid supplying apparatus 1 includes, as primary elements, a chamber 10 defining a space in which soldering is performed on a target object T, a vaporizer 20, a syringe 30, a pressurizing pump 45, a vacuum pump 55, and a controller 90.

In this embodiment, the formic acid supplying apparatus 1 is an apparatus capable of performing soldering on the target object T while supplying a formic acid gas FG. The target object T has a metallic portion on its surface, and the soldering is performed on the metallic portion on the surface of the target object T. As the target object T, a substrate or electronic component can be applied. When soldering is performed on the target object T without using a flux, it is preferred to reduce oxides on the metallic portion on the surface of the target object T with a reducing agent to remove the oxides, and, in this embodiment, formic acid is used as the reducing agent. The formic acid is stored in a formic acid liquid bottle 80 in a state of liquid (formic acid liquid FL) from the standpoint of convenience of storage, and is supplied into the chamber 10 in a state of gas (formic acid gas FG) from the standpoint of making it to exert its reduction ability. Formic acid is a type of carboxylic acid that serves as a reducing agent, and the formic acid gas FG corresponds to a reducing gas and the formic acid liquid FL corresponds to a reducing liquid (a liquid for reduction). Also, the formic acid supplying apparatus 1 corresponds to a reducing gas supplying apparatus.

As described above, the chamber 10 defines a space in which soldering is performed on the target object T. The chamber 10 has a loading/unloading port 11 through which the target object T can be taken into and out of the chamber 10. Also, the chamber 10 has an openable and closable shutter 12 that can close the loading/unloading port 11. The chamber 10 is configured to have an internal space that can be hermetically closed by closing the loading/unloading port 11 with the shutter 12. For the chamber 10, material and shape that can endure when the pressure in the internal space is reduced to a desired level (approximately 10 Pa (absolute pressure), for example) is employed. Also, an exhaust pipe 16 is connected to the chamber 10. An exhaust gate valve 17 that can shut off a flow path is installed in the exhaust pipe 16. Also, the chamber 10 is provided with a pressure sensor 18 for detecting a pressure therein.

The vaporizer 20 receives the formic acid liquid FL and generates the formic acid gas FG. In this embodiment, the vaporizer 20 includes a block 21 of a metal having a heat capacity higher than that of the formic acid liquid FL, a heater 22 embedded in the block 21, and a fluid flow path 23, formed in the block 21, through which a formic acid fluid (the formic acid liquid FL, the formic acid gas FG, or a mixed fluid of the formic acid liquid FL and the formic acid gas FG) flows, and is configured such that the formic acid liquid FL fed into the block 21 which has been preheated by the heater 22 receives heat from the block and vapors as the formic acid gas FG while flowing through the fluid flow path 23. Although the vaporizer 20 has the block 21, which is attached to an outer surface of the chamber 10 with an outlet 20d for the formic acid gas FG opening in the chamber 10, in this embodiment, the block 21 may be located at a position away from the chamber 10 with an outlet for the formic acid gas FG formed in the block 21 connected to the chamber 10 by a tube. In either case, the vaporizer 20 is located such that the generated the formic acid gas FG can be supplied to the chamber 10. As the vaporizer 20, in place of the vaporizer 20 having the block 21 as described above, a vaporizer configured to supply a carrier gas into the formic acid liquid FL to cause it to bubble and supply the formic acid gas FG together with the carrier gas may be used.

The syringe 30 temporarily reserves the formic acid liquid FL before the formic acid liquid FL stored in the formic acid liquid bottle 80 is fed into the vaporizer 20, and corresponds to an intermediate container. Reserving the formic acid liquid FL in the syringe 30 temporarily before the formic acid liquid FL in the formic acid liquid bottle 80 is fed into the vaporizer 20 allows removal of air bubbles that may be contained in the formic acid liquid FL transported from the formic acid liquid bottle 80 to the vaporizer 20. In this embodiment, the syringe 30 is formed of a material that can avoid or minimize corrosion under the influence of the formic acid, and has a main body 31 formed cylindrically of glass, and lids 32 provided at opposite ends of the main body 31. The main body 31 preferably has a volumetric capacity that is determined in view of the amount of the formic acid gas FG to be supplied into the chamber 10 and, in this embodiment, is formed to have an interior volume of approximately 10 to 50 cc. Also, the main body 31 is preferably formed to have an elongated shape in order to secure a space from the liquid surface of the formic acid liquid FL to an upper end when the formic acid liquid FL is reserved. In this embodiment, the lids 32 are constituted by coating stainless plates with polytetrafluoroethylene (PTFE), which is a kind of fluororesin. The lid 32 that closes the upper opening of the main body 31 when the main body 31 is placed such that the opening at its opposite ends are located vertically above and below each other is referred to as upper lid 32t, and the lid 32 that closes the lower opening is referred to as lower lid 32s. No piston is provided in the syringe 30.

The syringe 30 is equipped with a high liquid level sensor 35 and a low liquid level sensor 36. The high liquid level sensor 35 detects the formic acid liquid FL in the syringe 30 reaching a liquid level equal to a predetermined high liquid level. The low liquid level sensor 36 detects the formic acid liquid FL in the syringe 30 reaching a liquid level equal to a predetermined low liquid level. As the high liquid level sensor 35 and the low liquid level sensor 36, various sensors, such as a sensor that has a light-emitting element and a light-receiving element arranged with the glass main body 31 located therebetween and detects a liquid level by detecting whether light between the elements is blocked or a sensor that detects a liquid level by processing an image of a liquid surface taken from a side of the main body 31 with a camera, can be used.

The syringe 30 and the vaporizer 20 are connected by a supply tube 41. The supply tube 41 is a tube constituting a flow path for directing the formic acid liquid FL in the syringe 30 to the vaporizer 20. The supply tube 41 has a first end that is attached to the lower lid 32s so as to extend through the lower lid 32s of the syringe 30 and open in communication with the inside of the main body 31. The supply tube 41 has a second end that is connected to a formic acid liquid introduction port 20e of the vaporizer 20. A supply gate valve 43 that can shut off the flow path is installed in the supply tube 41. The low liquid level that the above-mentioned low liquid level sensor 36 detects is set at a position higher than the top of the first end of the supply tube 41 opening in communication with the inside of the main body 31 (a liquid level where the opening at the first end of the supply tube 41 is filled to the brim with the formic acid liquid FL).

In addition to the above-mentioned supply tube 41, a transport tube 51, a pressurizing tube 46, and a vacuum tube 56 are connected to the syringe 30. Each of the transport tube 51, the pressurizing tube 46, and the vacuum tube 56 is attached to the upper lid 32t so as to extend through the upper lid 32t of the syringe 30 and open in communication with the inside of the main body 31. The transport tube 51 is a tube constituting a flow path for directing the formic acid liquid FL in the formic acid liquid bottle 80 to the syringe 30. The transport tube 51 has a first end that extends through the upper lid 32t as described above, extends to a middle part in the main body 31, and opens in the main body 31. An end 51e (the first end) of the transport tube 51 in the main body 31 is located above the high liquid level that is detected by the high liquid level sensor 35. The transport tube 51 has a second end connected to the formic acid liquid bottle 80. A transport gate valve 53 that can shut off the flow path is installed in the transport tube 51. When a connector 52, such as a rapid fluid joint (coupling), is provided on the transport tube 51 between the transport gate valve 53 and the formic acid liquid bottle 80, the syringe 30 and the formic acid liquid bottle 80 can be easily attached and detached via the transport tube 51. This is preferred for easy replacement of the formic acid liquid bottle 80.

The pressurizing tube 46 is a tube constituting a flow path for directing an inert gas (nitrogen gas in this embodiment) for pressurizing the inside of the syringe 30 to the syringe 30. The pressurizing tube 46 has a first end that is attached to the upper lid 32t so as to extend through the upper lid 32t of the syringe 30 and open in communication with the inside of the main body 31. The pressurizing tube 46 has a second end connected to a nitrogen gas source such as a nitrogen gas tank (not shown). A pressurizing pump 45 for feeding the nitrogen gas under pressure is installed in the pressurizing tube 46. The pressurizing pump 45 can pressurize the inside of the syringe 30 by supplying the nitrogen gas into the syringe 30, and corresponds to a pressurizing part. The pressurizing pump 45 may be a compressor. A pressurizing gate valve 47 that can shut off the flow path is installed in the pressurizing tube 46 between the pressurizing pump 45 and the syringe 30. Because the formic acid liquid FL in the syringe 30 can be delivered into the vaporizer 20 via the supply tube 41 when the pressurizing pump 45 is operated with the supply gate valve 43 and the pressurizing gate valve 47 opened to supply nitrogen gas into the syringe 30 via the pressurizing tube 46 in order to pressurize the inside of the syringe 30, the supply gate valve 43, the pressurizing pump 45, the pressurizing tube 46, and the pressurizing gate valve 47 constitute a supply part 48.

The vacuum tube 56 is a tube constituting a flow path for discharging gas in the syringe 30 to create a negative pressure (pressure lower than the ambient pressure) in the syringe 30. The vacuum tube 56 has a first end that is attached to the upper lid 32 so as to extend through the upper lid 32t of the syringe 30 and open in communication with the inside of the main body 31. The vacuum tube 56 has a second end opened outside the syringe 30. A vacuum pump 55 is installed in the vacuum tube 56. The vacuum pump 55 can create a negative pressure in the syringe 30 by discharging gas in the syringe 30, and corresponds to a negative pressure generating part. A vacuum gate valve 57 that can shut off the flow path is installed in the vacuum tube 56 between the vacuum pump 55 and the syringe 30. Because the formic acid liquid FL in the formic acid liquid bottle 80 can be transported into the syringe 30 by a pressure difference between the inside of the syringe 30 and the inside of the formic acid liquid bottle 80 when the vacuum pump 55 is operated with the transport gate valve 53 and the vacuum gate valve 57 opened to discharge the gas in the syringe 30 to the outside via the vacuum tube 56 in order to create a negative pressure in the syringe 30, the transport gate valve 53, the vacuum pump 55, the vacuum tube 56, and the vacuum gate valve 57 constitute a transport part 58. When the end of the transport tube 51 in the main body 31 of the syringe 30 is located above the high liquid level that is detected by the high liquid level sensor 35 as described above, the end of the transport tube 51 can be prevented from being submerged in liquid. This ensures introduction of the formic acid liquid FL when a negative pressure is created in the syringe 30. It is preferred to set the high liquid level at a relatively low position so that the vacuum pump 55 does not suck the formic acid liquid FL when a negative pressure is created in the syringe 30 and that the formic acid liquid FL does not flow back into the transport tube 51 when the inside of the syringe 30 is pressurized by the pressurizing pump 45. The exhaust pipe 16 has a second end connected to the vacuum tube 56 between the vacuum pump 55 and the vacuum gate valve 57 with its first end connected to the chamber 10. In this configuration, the vacuum pump 55 serves as both a device for creating a negative pressure in the syringe 30 and a device for creating a negative pressure in the chamber 10.

The formic acid liquid bottle 80 is a bottle containing the formic acid liquid FL to be transported to the syringe 30, and corresponds to a reducing liquid bottle. The formic acid liquid bottle 80 has a main body 81 containing the formic acid liquid FL, and a bottle cap 83 for closing an opening of the main body 81. When the formic acid liquid FL is commercially available in a bottle, the bottle can be directly used as the main body 81, and bottles of various sizes, such as 3.8 L or 500 mL bottles, can be used. Although not shown, the bottle cap 83, which has a threaded inner surface so that it can be threadedly mounted on the main body 81, has an end face having a through hole through which the transport tube 51 can extend and is provided with a filter with a check valve. The filter with a check valve is a filter configured to allow intake of air (outside air) from outside to inside but does not allow passage of air in the opposite direction (from inside to outside). The bottle cap 83 can be threadedly mounted on commercially-available bottles of various sizes as the main bodies 81 with the aid of an adapter when necessary. The formic acid liquid bottle 80 may be mounted on a load cell 88 when used so that the amount of the formic acid liquid FL remaining therein can be managed.

The controller 90 is a device that controls operation of the formic acid supplying apparatus 1. The controller 90 has a receiving part 91, a vacuum control part 92, a pressurization control part 93, a total control part 94, and a calculation part 95. The receiving part 91 is electrically connected to each of the pressure sensor 18, the high liquid level sensor 35, and the low liquid level sensor 36 in a wired or wireless manner, and is configured to be able to receive a result detected by each sensor as a signal. The vacuum control part 92 is electrically connected to the vacuum pump 55 in a wired or wireless manner, and is configured to be able to control start and stop of the vacuum pump 55. The vacuum control part 92 corresponds to a first control part. The pressurization control part 93 is electrically connected to the pressurizing pump 45 in a wired or wireless manner, and is configured to be able to control start and stop of the pressurizing pump 45. The pressurization control part 93 serves as a second control part and a third control part. The total control part 94 is electrically connected to the shutter 12 of the chamber 10 in a wired or wireless manner, and is configured to be able to control open and close of the shutter 12. Also, the total control part 94 is electrically connected to the vaporizer 20 in a wired or wireless manner, and is configured to be able to control start and stop of the heater 22 of the vaporizer 20. Also, the total control part 94 is electrically connected to each of the exhaust gate valve 17, the supply gate valve 43, the pressurizing gate valve 47, the transport gate valve 53, and the vacuum gate valve 57 in a wired or wireless manner, and is configured to be able to control open and close of each valve. The calculation part 95 is configured to be able to estimate the amount of the formic acid gas FG in the chamber 10 based on a pressure detected by the pressure sensor 18. The estimation of the amount of the formic acid gas FG by the calculation part 95 is achieved utilizing the fact that the partial pressure of the formic acid gas FG in the chamber 10 increases and the internal pressure in the chamber 10 increases when a large amount of formic acid gas FG is supplied into the chamber 10. Although the receiving part 91, the vacuum control part 92, the pressurization control part 93, the total control part 94, and the calculation part 95 constituting the controller 90 are constituted separately from the standpoint of functions in the illustrated example, they may be constituted in an inseparable manner. Alternatively, each of the parts 91, 92, 93, 94 and 95 may be arranged separately instead of being arranged collectively as illustrated.

Referring continuously to FIG. 2, a method for manufacturing a processed target object obtained by performing soldering on the target object T using the formic acid supplying apparatus 1 according to an embodiment of the present invention is described. FIG. 2 is a flowchart showing a procedure for manufacturing a processed target object. The following description of a method for manufacturing a processed target object using the formic acid supplying apparatus 1 also serves as description of the operation of the formic acid supplying apparatus 1. In the following description, when mention is made of the configuration of the formic acid supplying apparatus 1, reference is made to FIG. 1 as appropriate.

When the formic acid supplying apparatus 1 is not in operation, the shutter 12 is closed, the pressurizing pump 45 and the vacuum pump 55 are stopped, and each valve (the exhaust gate valve 17, the supply gate valve 43, the pressurizing gate valve 47, the transport gate valve 53, and the vacuum gate valve 57) are closed. When the formic acid supplying apparatus 1 is activated, the pressurizing pump 45 and the vacuum pump 55 are activated, and the pressurizing pump 45 and the vacuum pump 55 are constantly being operated while the formic acid supplying apparatus 1 is in operation. Also, in this embodiment, the controller 90 activates the heater 22 of the vaporizer 20 simultaneously with the activation of the formic acid supplying apparatus 1. In this state, the formic acid liquid bottle 80 is first set (S1). To set the formic acid liquid bottle 80, a commercially-available bottled formic acid liquid FL is typically obtained, and the lid of the bottle is replaced with the bottle cap 83 to utilize the bottle as the main body 81. In this way, the formic acid liquid bottle 80 can be set easily because it is only necessary to replace the bottle cap 83 without the need to transfer the formic acid liquid FL into another container. The step (S1) of setting the formic acid liquid bottle 80 may be performed while the formic acid supplying apparatus 1 is not in operation. In the step (S1) of setting the formic acid liquid bottle 80, the transport tube 51 is inserted through the through hole of the bottle cap 83 until the second end of the transport tube 51 reaches a position close to the bottom of the main body 81. At this time, the air present in the transport tube 51 before it is immersed into the formic acid liquid FL may be mixed into the formic acid liquid FL contained in the main body 81.

Next, the controller 90 opens the exhaust gate valve 17 (S2). When the exhaust gate valve 17 is opened, the gas in the chamber 10 is discharged through the exhaust pipe 16 and a part of the vacuum tube 56. By discharging the gas in the chamber 10 out of the chamber 10 through the exhaust pipe 16 and so on before the shutter 12 is opened, it is possible to prevent the gas in the chamber 10 from flowing out of the chamber 10 through the loading/unloading port 11 when the shutter 12 is opened. The flow rate of the gas discharged out of the chamber 10 through the exhaust pipe 16 and so on is sufficient if a negative pressure sufficient to prevent the gas in the chamber 10 from flowing out through the loading/unloading port 11 can be created in the chamber 10. In this way, even when the formic acid gas FG remains in the chamber 10, the formic acid gas FG is prevented from directly flowing out of the chamber 10. Next, the shutter 12 of the chamber 10 is opened, and the target object T is supplied into the chamber 10 (S3). The opening and closing operations to the shutter 12 is typically achieved by the controller 90 controlling open and close of the shutter 12 in response to the operator of the apparatus pressing a button (not shown) to open the shutter 12. After the target object T is transported into the chamber 10, the controller 90 closes the shutter 12 to hermetically close the inside of the chamber 10. By maintaining the exhaust gate valve 17 in an open state even after the chamber 10 is hermetically closed, the pressure in the chamber 10 is reduced to a degree of vacuum suitable for soldering of the target object T (approximately 100 Pa (absolute pressure), for example).

After the target object T is supplied into the chamber 10, the controller 90 opens the transport gate valve 53 and the vacuum gate valve 57 (S4). Then, the pressure in the syringe 30 is reduced to a negative pressure, the formic acid liquid FL in the formic acid liquid bottle 80 is transported without being scattered into the syringe 30 through the transport tube 51 by a pressure difference between the inside of the formic acid liquid bottle 80 and the inside of the syringe 30. At this time, the formic acid liquid FL in the formic acid liquid bottle 80 is sucked through the transport tube 51 until a negative pressure is created in the formic acid liquid bottle 80, outside air is introduced into the formic acid liquid bottle 80 through the filter with a check valve provided on the bottle cap 83 until the pressure in the formic acid liquid bottle 80 is equilibrated. Also, by vacuuming the formic acid liquid FL in the formic acid liquid bottle 80 into the syringe 30, even when air is mixed into the formic acid liquid FL when the transport tube 51 is inserted into the formic acid liquid bottle 80, the gas that may be present in the formic acid liquid FL transported into the syringe 30 is sucked into the vacuum pump 55. Thus, air bubbles can be removed from the formic acid liquid FL in the syringe 30.

After opening the transport gate valve 53 and the vacuum gate valve 57, the controller 90 determines whether the high liquid level sensor 35 has detected the high liquid level (S5). If the high liquid level sensor 35 has not detected the high liquid level, the process returns to the step (S5) of determining whether the high liquid level sensor 35 has detected the high liquid level again. On the other hand, if the high liquid level sensor 35 has detected the high liquid level, the transport gate valve 53 and the vacuum gate valve 57 are closed (S6). When the transport gate valve 53 and the vacuum gate valve 57 are closed, the transport of the formic acid liquid FL from the formic acid liquid bottle 80 to the syringe 30 is stopped. By stopping the transport of the formic acid liquid FL into the syringe 30 upon detection of the high liquid level, it is possible to prevent the transport tube 51 in the syringe 30 from being submerged in the formic acid liquid FL. After closing the transport gate valve 53 and the vacuum gate valve 57, the controller 90 closes the exhaust gate valve 17 (S7).

Next, the controller 90 opens the supply gate valve 43 and the pressurizing gate valve 47 (S8). When the supply gate valve 43 and the pressurizing gate valve 47 are opened, the nitrogen gas is supplied to an upper part in the syringe 30 and the gas phase portion in the syringe 30 is pressurized. Then, the formic acid liquid FL in the syringe 30 is supplied to the vaporizer 20 through the supply tube 41 by a pressure difference between the inside of the syringe 30 and the inside of the vaporizer 20. The pressurization in the syringe 30 here is pressurization relative to the vacuum (negative pressure) in the chamber 10, and is equal to or lower than the atmospheric pressure (approximately 0.005 MPa, for example). As the supply gate valve 43 and the pressurizing gate valve 47 are open, the formic acid liquid FL flows through the supply tube 41 into the vaporizer 20. Then, the formic acid liquid FL receives heat from the block 21 being heated by the heater 22 while flowing through the flow path 23 in the block 21, and vapors as the formic acid gas FG before flowing out of the vaporizer 20. The formic acid gas FG is then supplied into the chamber 10. In the chamber 10 into which the formic acid gas FG has been supplied, soldering is performed on the target object T to manufacture a soldered processed target object.

After opening the supply gate valve 43 and the pressurizing gate valve 47 to supply the formic acid liquid FL to the vaporizer 20 in order to supply the formic acid gas FG into the chamber 10, the controller 90 determines whether a predetermined amount of formic acid liquid FL has been supplied to the vaporizer 20 (S9). Whether a predetermined amount is supplied is grasped by the calculation part 95 by estimating the amount of formic acid gas FG supplied to the chamber 10 from a pressure detected by the pressure sensor 18. Here, the predetermined amount is an amount of formic acid liquid FL supplied to the vaporizer 20 that is sufficient to supply an amount of formic acid gas FG necessary to perform soldering on the target object T in the chamber 10 appropriately. When soldering is performed on the target object T in the chamber 10, it is not the formic acid liquid FL but the formic acid gas FG that acts to remove an oxide film on the metallic portion of the target object T. Thus, if a portion of the formic acid liquid FL supplied to the vaporizer 20 is not vaporized and supplied into the chamber 10 in the form of formic acid liquid FL, the unvaporized formic acid liquid FL does not act effectively. In this case, compared to the case where all the formic acid liquid FL supplied to the vaporizer 20 is converted into the formic acid gas FG and supplied into the chamber 10, it is not considered that the predetermined amount of formic acid liquid FL is supplied to the vaporizer 20 when a portion of the formic acid liquid FL is not vaporized even if the amount of formic acid liquid FL supplied to the vaporizer 20 is the same. Because an increase in pressure detected by the pressure sensor 18 can be regarded as an increase in partial pressure of the formic acid gas FG in the chamber 10, it is possible to estimate the amount of formic acid gas FG supplied to the chamber 10 from a pressure detected by the pressure sensor 18.

If the predetermined amount has not been supplied in the step (S9) of determining whether a predetermined amount of formic acid liquid FL has been supplied to the vaporizer 20, the controller 90 determines whether the low liquid level sensor 36 has detected the low liquid level (S10). If the low liquid level sensor 36 has not detected the low liquid level, the process returns to the step (S9) of determining whether a predetermined amount of formic acid liquid FL has been supplied to the vaporizer 20. On the other hand, if the low liquid level sensor 36 has detected the low liquid level in the step (S10) of determining whether the low liquid level sensor 36 has detected the low liquid level, or if the predetermined amount has been supplied in the step (S9) of determining whether a predetermined amount of formic acid liquid FL has been supplied to the vaporizer 20, the controller 90 closes the supply gate valve 43 and the pressurizing gate valve 47 (S11). When the supply gate valve 43 and the pressurizing gate valve 47 are closed, the supply of the formic acid liquid FL to the vaporizer 20 is stopped. When the supply of the formic acid liquid FL to the vaporizer 20 is stopped upon detection of the low liquid level by the low liquid level sensor 36, the inlet of the supply tube 41 can be maintained filled with the formic acid liquid FL and mixing of gas into the supply tube 41 can be therefore avoided. When the supply of the formic acid liquid FL to the vaporizer 20 is stopped when the predetermined amount of formic acid liquid FL is supplied to the vaporizer 20, it is possible to prevent an excessive amount of formic acid liquid FL from being supplied to the vaporizer 20. The step (S9) of determining whether a predetermined amount of formic acid liquid FL has been supplied to the vaporizer 20 and the step (S10) of determining whether the low liquid level sensor 36 has detected the low liquid level may be performed in the opposite order or simultaneously.

After closing the supply gate valve 43 and the pressurizing gate valve 47, the controller 90 opens the exhaust gate valve 17 (S12). After a slight negative pressure is created in the chamber 10 by opening the exhaust gate valve 17 in order to prevent the gas in the chamber 10 from flowing out of the chamber 10 in this way, the shutter 12 is opened so that the processed target object T can be taken out of the chamber 10 (S13). Manufacture of a processed target object production is thereby completed. When the next processed target object is manufactured after the completion of manufacture of one processed target object, the above-mentioned flow is repeated. However, when the formic acid liquid FL remains in the formic acid liquid bottle 80 and there is no need to set a new formic acid liquid bottle 80, the process can be started from the step (S3) of supplying the target object T into the chamber 10 in the above flowchart because the exhaust gate valve 17 has been opened in step (S13). The discharged gas containing the formic acid gas FG used in soldering of the target object T in the chamber 10 is directed to a catalyst unit (not shown) through the exhaust pipe 16 and the vacuum tube 56, and discharged from the catalyst unit (not shown) after being subjected to a treatment to reduce the concentration of formic acid in the discharged gas to a level that does not affect the environment.

As described above, according to the formic acid supplying apparatus 1 according to this embodiment, the formic acid liquid FL in the formic acid liquid bottle 80 is temporarily transported into the syringe 30 by creating a negative pressure in the syringe 30 connected to the formic acid liquid bottle 80 via the transport tube 51, and then the formic acid liquid FL in the syringe 30 is supplied to the vaporizer 20 through the supply tube 41 by pressurizing the inside of the syringe 30. Thus, the formic acid liquid FL in the formic acid liquid bottle 80 can be supplied to the vaporizer 20 without causing scattering of the formic acid liquid FL that may occur when the inside of a conventional pressure tank in which a bottle containing a formic acid liquid is installed is pressurized. Also, because the formic acid liquid FL in the formic acid liquid bottle 80 is transported to the syringe 30 by creating a negative pressure in the syringe 30, air bubbles contained in the formic acid liquid FL in the formic acid liquid bottle 80, if any, can be removed by vacuuming. Also, the formic acid liquid FL in the syringe 30 is supplied to the vaporizer 20 by pressurizing the inside of the syringe 30, there is no need to provide a pump (pump designed to resist formic acid) for transporting the formic acid liquid FL. Also, because the formic acid liquid bottle 80 containing the formic acid liquid FL can be replaced entirely when the formic acid liquid FL in the formic acid liquid bottle 80 is consumed, the supply of the formic acid liquid FL to the vaporizer 20 can be continued easily and safely.

In the above description, the amount of formic acid gas FG to be supplied into the chamber 10 is managed based on a pressure detected by the pressure sensor 18 provided in the chamber 10. However, instead of or in addition to this, a flowmeter may be provided in the supply tube 41 so that the management can be made based on a flow rate of the formic acid liquid FL being supplied to the vaporizer 20 that is detected by the flowmeter. Alternatively, the management may be made by setting the amount of formic acid liquid FL between the high liquid level detected by the high liquid level sensor 35 and the low liquid level detected by the low liquid level sensor 36 as the amount to be supplied to the vaporizer 20 per process, or based on a calculation result obtained by calculating the amount of formic acid liquid FL to be supplied to the vaporizer 20 from the relationship between the supply flow rate of the formic acid liquid FL to the vaporizer 20 through the supply tube 41 during rated operation by activation of the pressurizing pump 45 and the liquid feed time.

In the above description, while the pressurizing pump 45 and the vacuum pump 55 are constantly being operated when the formic acid supplying apparatus 1 is in operation, the supply gate valve 43 and the pressurizing gate valve 47 are closed when the supply of the formic acid liquid FL from the syringe 30 to the vaporizer 20 is stopped. However, if any inconvenience caused by shut off operation occurs, the pressurizing pump 45 may be stopped when the supply gate valve 43 and the pressurizing gate valve 47 are closed. Also, in the above description, the second end of the exhaust pipe 16 is connected to the vacuum tube 56, and the vacuum pump 55 serves as both a device for creating a negative pressure in the syringe 30 and a device for creating a negative pressure in the chamber 10. However, a discharge pump (not shown) for discharging the gas in the chamber 10 may be provided in the exhaust pipe 16 with the exhaust pipe 16 constituted as a system independent of the vacuum tube 56 without connecting the second end of the exhaust pipe 16 to the vacuum tube 56 so that the creation of a negative pressure in the syringe 30 and the creation of a negative pressure in the chamber 10 can be controlled individually. In this case, when the exhaust gate valve 17, the transport gate valve 53, and the vacuum gate valve 57 are actuated, the discharge pump (not shown) and/or the vacuum pump 55 may be started or stopped as needed in accordance with the above-mentioned example of control of the pressurizing pump 45.

In the above description, the formic acid gas FG is used as a reducing gas. However, a carboxylic acid gas other than the formic acid gas FG hydrogen or the like may be used. However, the formic acid gas FG is preferably used as a reducing gas from the standpoint of availability and convenience in soldering.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

DESCRIPTION OF REFERENCE NUMERALS AND SYMBOLS 1 formic acid supplying apparatus
10 chamber
18 pressure sensor
20 vaporizer
30 syringe
35 high liquid level sensor
36 low liquid level sensor
41 supply tube
45 pressurizing pump
48 supply part
51 transport tube
55 vacuum pump
58 transport part
80 formic acid liquid bottle
83 bottle cap
90 controller
92 vacuum control part
93 pressurization control part
FG formic acid gas
FL formic acid liquid
T target object

The invention claimed is:
1. A reducing gas supplying apparatus, comprising:
 a chamber defining a space in which soldering is performed on a target object;
 a vaporizer for generating a reducing gas to be supplied into the chamber, the vaporizer being configured to receive a reducing liquid to be converted into the reducing gas and vaporize the reducing liquid to generate the reducing gas;
 an intermediate container for temporarily reserving the reducing liquid before the reducing liquid in a reducing liquid bottle containing the reducing liquid is introduced into the vaporizer;
 a transport tube for directing the reducing liquid in the reducing liquid bottle to the intermediate container;
 a supply tube for directing the reducing liquid in the intermediate container to the vaporizer;
 a transport part for delivering the reducing liquid in the reducing liquid bottle into the intermediate container; and
 a supply part for delivering the reducing liquid in the intermediate container into the vaporizer.

2. The reducing gas supplying apparatus according to claim 1, wherein the transport part includes a negative pressure generating part for creating a negative pressure in the intermediate container.

3. The reducing gas supplying apparatus according to claim 1, wherein the supply part includes a pressurizing part for pressurizing an inside of the intermediate container.

4. The reducing gas supplying apparatus according to claim 1, further comprising the reducing liquid bottle having a bottle cap, the bottle cap being configured to take in outside air through a filter with a check valve when the reducing liquid bottle has a negative pressure therein.

5. The reducing gas supplying apparatus according to claim 1, further comprising:
 a high liquid level sensor for detecting a liquid surface of the reducing liquid in the intermediate container reaching a liquid level equal to a predetermined high liquid level; and
 a first control part for controlling the transport part to stop the delivery of the reducing liquid in the reducing liquid bottle into the intermediate container when the high liquid level sensor detects the high liquid level.

6. The reducing gas supplying apparatus according to claim 5, further comprising:

a low liquid level sensor for detecting the liquid surface of the reducing liquid in the intermediate container reaching a liquid level equal to a predetermined low liquid level; and a second control part for controlling the supply part to stop the delivery of the reducing liquid in the intermediate container into the vaporizer when the low liquid level sensor detects the low liquid level.

7. The reducing gas supplying apparatus according to claim 1, further comprising:

a pressure sensor for detecting a pressure in the chamber; and a third control part for controlling the supply part to adjust the amount of the reducing liquid to be delivered into the vaporizer based on a pressure detected by the pressure sensor.

8. A method for manufacturing a processed target object obtained by performing soldering on the target object using a reducing gas supplying apparatus according to claim 1, the method comprising the steps of:

supplying the target object into the chamber;

performing soldering on the target object while supplying the reducing gas into the chamber; and taking the target object on which the soldering has been performed out of the chamber.

\* \* \* \* \*